US009533639B2

(12) United States Patent
Farrell (10) Patent No.: US 9,533,639 B2
(45) Date of Patent: Jan. 3, 2017

(54) HIGH VOLTAGE CONNECTOR SYSTEM AND METHOD

(71) Applicant: Johnson Controls Technology LLC, Wilmington, DE (US)

(72) Inventor: Anthony E. Farrell, Holland, MI (US)

(73) Assignee: Johnson Controls Technology LLC, Wilmington, DE (US)

( * ) Notice: Subject to any disclaimer, the term of this patent is extended or adjusted under 35 U.S.C. 154(b) by 152 days.

(21) Appl. No.: 14/019,396

(22) Filed: Sep. 5, 2013

(65) Prior Publication Data

US 2014/0062493 A1    Mar. 6, 2014

Related U.S. Application Data

(60) Provisional application No. 61/697,557, filed on Sep. 6, 2012.

(51) Int. Cl.
| | |
|---|---|
| *G01N 27/416* | (2006.01) |
| *H02J 7/00* | (2006.01) |
| *B60R 16/033* | (2006.01) |
| *B60L 11/18* | (2006.01) |

(52) U.S. Cl.
CPC .............. *B60R 16/033* (2013.01); *B60L 11/18* (2013.01); *Y02T 10/7005* (2013.01); *Y10T 29/49117* (2015.01)

(58) Field of Classification Search
CPC .................................................. G01R 31/3648
USPC ......................................................... 324/426
See application file for complete search history.

(56) References Cited

U.S. PATENT DOCUMENTS

| | | |
|---|---|---|
| 7,084,361 B1 | 8/2006 | Bowes et al. |
| 7,402,068 B1 | 7/2008 | Tarchinski |
| 7,508,097 B2 | 3/2009 | Furuta et al. |
| 7,586,722 B2 | 9/2009 | Scholer et al. |
| 7,828,586 B2 | 11/2010 | Gorczyca et al. |
| 8,043,108 B2 | 10/2011 | Engbring et al. |
| 8,083,533 B2 | 12/2011 | De Chazal |
| 8,466,586 B2 | 6/2013 | Tarchinski et al. |

(Continued)

FOREIGN PATENT DOCUMENTS

| | | |
|---|---|---|
| DE | 102006016137 A1 | 10/2007 |
| DE | 10-2010-050124 B3 | 1/2012 |
| FR | 2968139 A1 | 6/2012 |

OTHER PUBLICATIONS

International Search Report and Written Opinion for PCT Application No. PCT/US2013/058494 dated May 8, 2014; 12 pgs.

*Primary Examiner* — Edward Tso
*Assistant Examiner* — Ahmed Omar
(74) *Attorney, Agent, or Firm* — Fletcher Yoder P.C.

(57) ABSTRACT

An electrical connector that has a first side configured to interface with a battery module and a second side configured to interface with a mating plug coupled to a first load. The electrical connector includes terminals extending through the first and second sides and configured to route power at a first voltage from the battery module to the mating plug; low voltage lines extending through the first and second sides, wherein the low voltage lines operate at a voltage less than the first voltage; and high voltage lines electrically coupled to the terminals via conductive leads and configured to route an electrical signal from the terminals to a second load. The electrical connector contains a secondary connection interface configured to allow access to the low and high voltage lines.

32 Claims, 8 Drawing Sheets

(56) References Cited

U.S. PATENT DOCUMENTS

2011/0151719 A1* 6/2011 DeWitte ............... 439/620.26
2012/0212882 A1   8/2012 Barkoczi
2013/0003237 A1   1/2013 Casey
2013/0106171 A1*  5/2013 Ferrel ............... B60L 3/0061
                                                    307/9.1

* cited by examiner

HIGH VOLTAGE CONNECTOR SYSTEM AND METHOD

CROSS REFERENCE TO RELATED APPLICATIONS

This application claims priority from and the benefit of U.S. Provisional Application Ser. No. 61/697,557, entitled "HIGH VOLTAGE CONNECTOR FOR HYBRID ELECTRIC VEHICLES WITH INTEGRATED HV SENSE LINES", filed Sep. 6, 2012, which is hereby incorporated by reference.

BACKGROUND

The present disclosure generally relates to the field of batteries and battery modules. More specifically, the present disclosure relates to high voltage battery connectors that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid electric vehicles (PHEVs), and electric vehicle conversions of hybrid electric vehicles and conventional internal combustion engine vehicles.

The battery-powered electric propulsion system in an HEV may have a high voltage rating, such as 60 volts, 130 volts, 350 volts or higher. Due to these high voltage ratings, battery systems for HEVs may include specialized interface connections for connecting the battery system to the vehicle's high voltage (HV) network or to a high voltage charger.

Due to the voltages levels present within such high voltage circuits, battery systems for HEVs often include a high voltage interlock (HVIL) circuit. The HVIL circuit is a low voltage circuit coupled with the battery system and is connected to a battery control unit of the HEV. The battery control unit is connected to a power switch that opens and closes the high voltage network. When the HVIL circuit is closed, the battery control unit closes the high voltage network, allowing the battery system to provide power to the various components of the HEV. When the HVIL circuit is opened, due to, for example, routine maintenance, the battery control unit opens and interrupts the high voltage network, effectively turning the battery system off.

Various types of measurement electronics may also be used in a HEV to monitor the battery system as well. These measurement electronics are electrically connected to the battery terminals used to connect the battery system to the high voltage network and/or high voltage charger. To facilitate the multiple required connections, interface connection systems can include cabling for the main high voltage conductors, in addition to low voltage conductors for the HVIL circuit. Additional connections are often made directly to bolted joints that form part of the main high voltage conductors. Such connections can extend the assembly time of the battery system, as personnel must ensure that the connections are made in the correct order and correctly routed away from the connection point. In addition, these connections made directly to the bolted joints can potentially lead to a loss of torque in the joints due to vibration of the vehicle.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure relates to batteries and battery modules. More specifically, the present disclosure relates to a connector used in conjunction with high voltage batteries. Particular embodiments are directed towards high voltage battery systems that may be used in vehicular contexts (e.g., xEVs) as well as other energy storage/expending applications (e.g., energy storage for an electrical grid).

In an embodiment, an integrated high voltage connector couples a high voltage battery module to various high voltage components and/or a high voltage charger via high voltage terminals. Low voltage lines to complete a high voltage interlock (HVIL) circuit coupled with the battery module are internal to the integrated high voltage connector.

High voltage sense lines to route electrical signals to measurement electronics used to monitor the battery module are also internal to the integrated high voltage connector. The high voltage sense lines are electrically coupled to the high voltage terminals via conductive leads within the connector. In other embodiments, other low voltage circuits may be incorporated into the integrated high voltage connector.

While the presently disclosed integrated connector is described with reference to a vehicle, it should be noted that such integrated high voltage connectors may be used in a variety of other high voltage energy storage/expending contexts. Further, it should be noted that the presently disclosed integrated connector may used in any context that employs a high voltage circuit element with an integrated HVIL function.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The battery system and high voltage connector described herein may be used to provide power to various types of electric vehicles and other high voltage energy storage/expending applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. These battery systems may include one or more high voltage connectors to connect each battery module to a high voltage load (e.g., high voltage network or charger) and to measurement electronics of an xEV. The high voltage connectors may also complete a high voltage interlock (HVIL) circuit, which in turn may be connected to a battery control unit of an xEV. The high voltage connectors may be configured such that the high voltage terminals of the battery module, the HVIL circuit, and the connections to the measurement electronics are all integral to a single high voltage connector.

Figure 1:
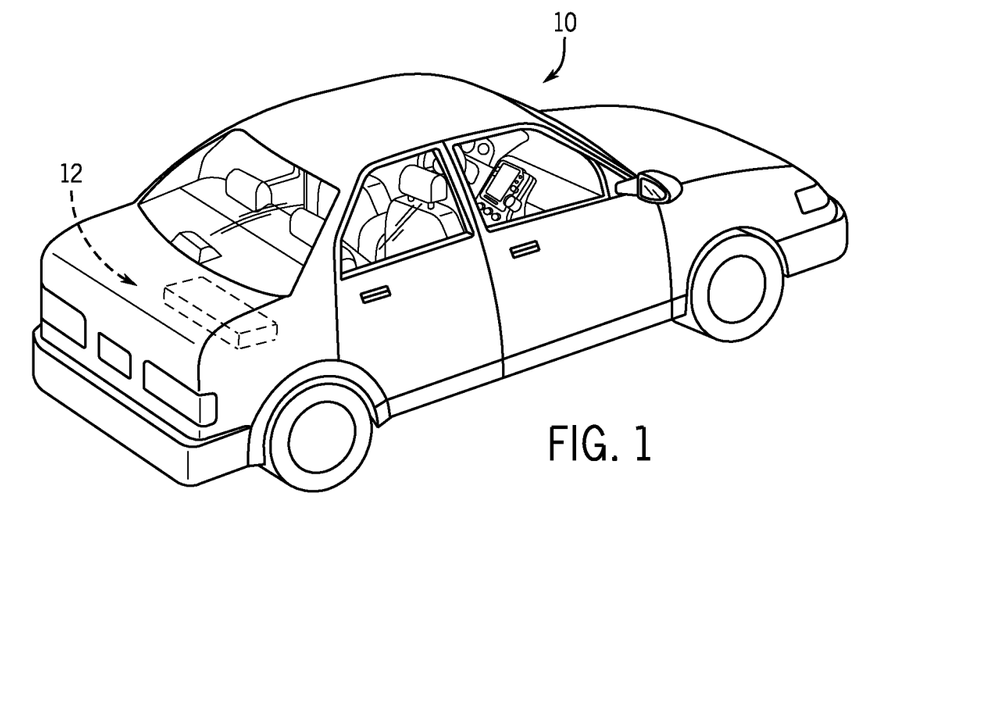
FIG. 1 is a perspective view of a vehicle (an xEV) having a battery system contributing a portion of the power for the vehicle, in accordance with an embodiment of the present approach.

With the foregoing in mind, FIG. 1 is a perspective view of an xEV 10 in the form of an automobile (e.g., a car) having a battery system 12 in accordance with present embodiments for providing a portion of the motive power for the vehicle 10, as described above. Although the xEV 10 may be any of the types of xEVs described above, by specific example, the xEV 10 may be a mHEV, including an internal combustion engine equipped with a microhybrid system which includes a start-stop system that may utilize the battery system 12 to power at least one or more accessories (e.g., AC, lights, consoles, etc.), as well as the ignition of the internal combustion engine, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 12 is illustrated in FIG. 1 as being positioned in the trunk or rear of the vehicle, according to other embodiments, the location of the battery system 12 may differ. For example, the position of the battery system 12 may be selected based on the available space within a vehicle, the desired weight balance of the vehicle, the location of other components used with the battery system 12 (e.g., battery control units, measurement electronics, etc.), and a variety of other considerations.

Figure 2:
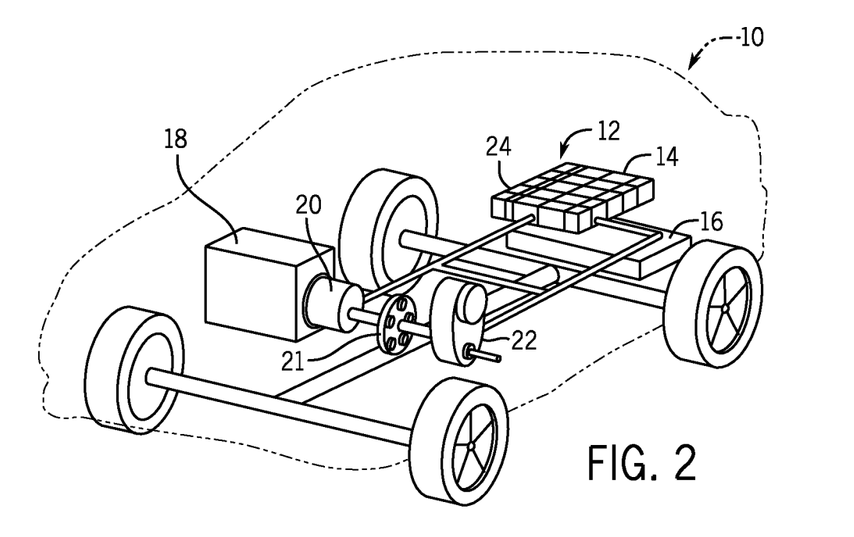
FIG. 2 is a cutaway schematic view of the xEV embodiment of FIG. 1, in the form of a hybrid electric vehicle (HEV), in accordance with an embodiment of the present approach.

An xEV 10 may be an HEV having the battery system 12, which includes one or more battery modules 14, as illustrated in FIG. 2. In particular, the battery system 12 illustrated in FIG. 2 is disposed toward the rear of the vehicle 10 proximate a fuel tank 16. In other embodiments, the battery system 12 may be provided immediately adjacent the fuel tank 16, provided in a separate compartment in the rear of the vehicle 10 (e.g., a trunk), or provided in another suitable location in the HEV 10. Further, as illustrated in FIG. 2, the HEV 10 includes an internal combustion engine 18 for times when the HEV 10 utilizes gasoline power to propel the vehicle 10. The HEV 10 also includes an electric motor 20, a power split device 21, and a generator 22 as part of the drive system.

The HEV 10 illustrated in FIG. 2 may be powered or driven by the battery system 12 alone, by the combustion engine 18 alone, or by both the battery system 12 and the combustion engine 18. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 12 and the type of vehicle, among other features, may differ from those shown or described.

The battery system 12 may generally include one or more battery modules 14, each having a plurality of battery cells (e.g., lithium ion electrochemical cells). The battery system 12 may include features or components for connecting the battery module 14 to components of the vehicle electrical system, as discussed in greater detail below. The battery system 12 may also include features that are responsible for monitoring the electrical performance of the one or more battery modules 14. Presently disclosed embodiments of the battery system 12 may include, for example, a single high voltage connector configured to couple the battery module 14 with the high voltage vehicle electrical system and to sensing circuitry. Further, the battery system 12 may include an HVIL circuit which, in conjunction with other components of the battery system 12, may effectively turn off the battery module 14 during inspection and servicing, for example.

The battery system 12 may also include a battery control unit 24 that may generally operate and control the battery module 14. The battery control unit 24 may include one or more circuit boards (e.g., printed circuit boards (PCBs)) that may include a processor and memory programmed to monitor and control the battery module 14 based on stored instructions.

Figure 3:
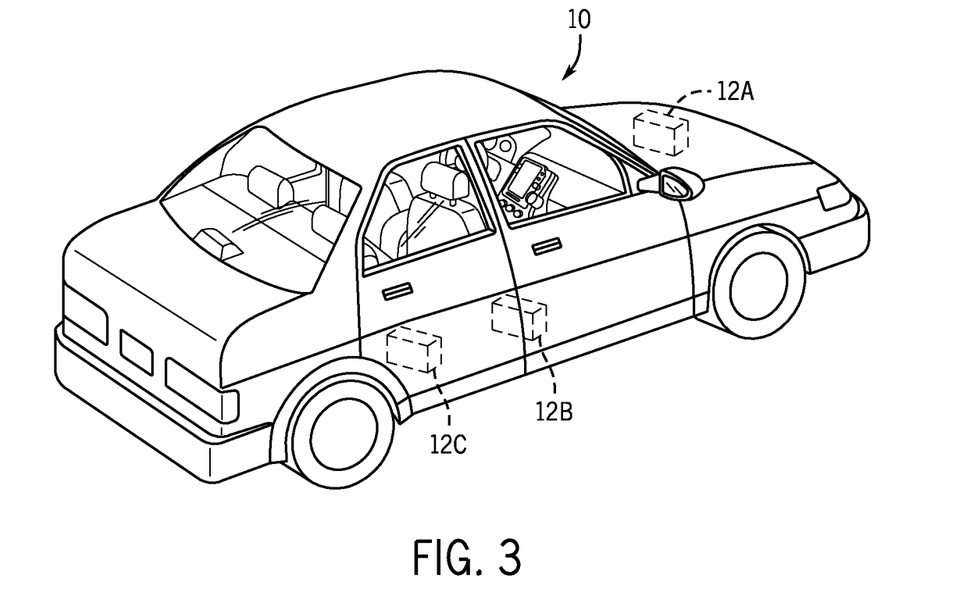
FIG. 3 is a schematic view of an embodiment of the xEV of FIG. 1 in the form of an HEV, in accordance with an embodiment of the present approach.

The battery system 12 may be positioned in one of several areas within an HEV 10, as illustrated in FIG. 3. For example, the xEV 10 may include the battery system 12A positioned near or next to a lead-acid battery of a typical combustion engine (e.g., under the hood of the xEV 10). By further example, in certain embodiments, the xEV 10 may include the battery system 12B positioned near a center of mass of the xEV 10, such as below the driver or passenger seat. By still further example, in certain embodiments, the xEV 10 may include the battery system 12C positioned below the rear passenger seat or near the trunk of the vehicle. It should be appreciated that, in certain embodiments, positioning a battery system 12 (e.g., battery system 12B or 12C) in or about the interior of the vehicle may enable the use of air from the interior of the vehicle to cool the battery system 12.

Figure 4:
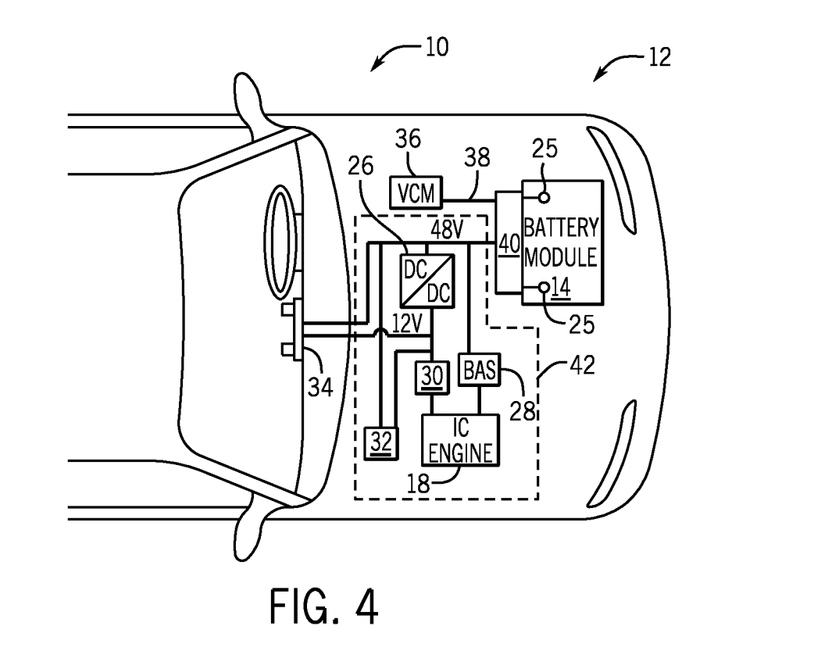
FIG. 4 is a schematic view of the HEV of FIG. 3 illustrating power distribution throughout the HEV, in accordance with an embodiment of the present approach.

Having now discussed the different areas in which the battery system 12 may be positioned, a more detailed description of the components present within the battery system 12 is provided in FIG. 4. The battery system 12 shown includes a battery module 14 capable of providing a 48 V output via two high voltage contacts 25 (e.g., positive terminal and negative terminal). The battery module 14 may be coupled to one or more DC-to-DC converters 26 to produce another suitable voltage output, such as 12 V. In other embodiments, the battery system 12 may include two or more battery modules 14, each of which provides a specific output voltage. As illustrated, the 48 V output of the battery module 14 may be provided to a high voltage network 42. The high voltage network 42 connects the high voltage output (e.g., 48 V) of the battery module 14 to various components of the HEV 10. For example, the high voltage network 42 may couple the battery module 14 to a belt alternator starter (BAS) 28, which may be used to start the internal combustion engine 18 during a start-stop cycle. The 12 V output of the DC-to-DC converter 26 may be coupled to a traditional ignition system (e.g., starter motor 30) to start the internal combustion engine 18 during instances when the BAS 28 is not used to do so. It should also be understood that the BAS 28 may capture energy from a regenerative braking system of the like (not shown) to recharge the battery module 14. In this way, the BAS 28 may function as a high voltage charger coupled to the battery module 14.

In the illustrated embodiment, the 48 V output of the battery module 14 may be used to power one or more components and accessories of the HEV 10 via the high voltage network 42. For example, as illustrated in FIG. 4, the 48 V output of the battery module 14 may be coupled to a heating, ventilation, and air conditioning (HVAC) system 32 (e.g., including compressors, heating coils, fans, pumps, and so forth) of the HEV 10 to enable the driver to control the temperature of the interior of the HEV 10 during operation of the vehicle. This is particularly important in an HEV 10 during idle periods when the internal combustion engine 18 is stopped and, thus, not providing any electrical power via engine charging. As also illustrated in FIG. 4, the 48 V output of the battery module 14 may be coupled to a vehicle console 34, which may include entertainment systems (e.g., radio, CD/DVD players, viewing screens, etc.), warning lights and indicators, controls for operating the HEV 10, and so forth. Hence, it should be appreciated that the 48 V output may, in certain situations, provide a more efficient voltage at which to operate the components and accessories of the HEV 10 (e.g., compared to 12 V), especially when the internal combustion engine 18 is stopped (e.g., during start-stop cycles). It should also be appreciated that, in certain embodiments, the 48 V output of the battery module 14 may also be provided to any other suitable components and/or accessories (e.g., lights, switches, door locks, window motors, windshield wipers, and so forth) of the HEV 10.

Also, the HEV 10 illustrated in FIG. 4 includes a vehicle control module (VCM) 36 that may control one or more operational parameters of the various components of the vehicle 10, and the VCM 36 may include at least one processor and memory programmed to perform such tasks. Like other components of the HEV 10, the battery module 14 may be coupled to the VCM 36 via one or more communication lines 38, such that the VCM 36 may receive input from the battery module 14 and from the battery control unit 24. For example, the VCM 36 may receive input from the battery module 14 regarding various parameters, such as state of charge and temperature, and the VCM 36 may use these inputs to determine when to charge and/or discharge the battery module 14, when to discontinue charging the battery module 14, when to start and stop the internal combustion engine 18 of the HEV 10, whether to use the BAS 28 or the starter motor 30, and so forth.

Figure 5:
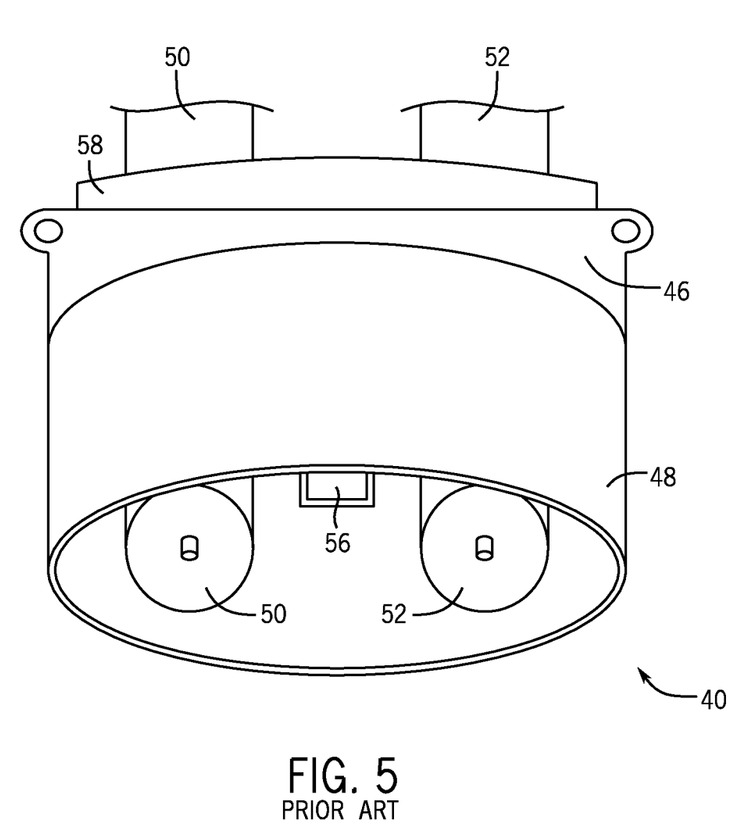
FIG. 5 is a perspective view of a conventional high voltage connector for an xEV.

A conventional high voltage connector 40 may include a body 46 that, on one side, extends into an external shell 48 which houses a high voltage (HV) positive terminal 50 and a high voltage (HV) negative terminal 52, as illustrated in FIG. 5. A mating high voltage plug (not shown) may be slid into the external shell 48, electrically connecting the battery module 14 to the high voltage network 42 and/or a high voltage charger. That is, the mating high voltage plug may include cables that extend outward and couple to the high voltage components of the HEV 10.

The external shell 48 may also house an access point to a high voltage interlock (HVIL) circuit through two HVIL lines 56. The HVIL circuit is a low voltage circuit coupled with the high voltage batteries of the battery system 12 and connected to the battery control unit 24. As one skilled in the art would appreciate, the HVIL circuit acts, in conjunction with other components, as a mechanism to effectively turn the battery system 12 on or off during, for example, routine maintenance or servicing tasks.

In the illustrated embodiment, the HV positive terminal 50 and the HV negative terminal 52 extend from the external shell 48 through the body 46 and project out of the opposite side of the high voltage connector 40. In the illustrated embodiment, the projected portions of the HV positive terminal 50 and the HV negative terminal 52 are partially covered by an internal shell 58. The HVIL lines 56 also extend through the body 46 and connect to an access point within the internal shell 58. This side of the high voltage connector 40 with the internal shell 58 interfaces with the battery module 14.

To monitor various metrics of the battery module 14 and the battery system 12, the battery control unit 24 may receive input from measurement electronics relating to various conditions of the battery module 14. The measurement electronics may include various types of sensors such as voltage sensors, temperature sensors, and pressure sensors. One or more of the measurement electronics may be electrically connected to the HV positive terminal 50 and the HV negative terminal 52 of the high voltage connector 40.

Figure 6:
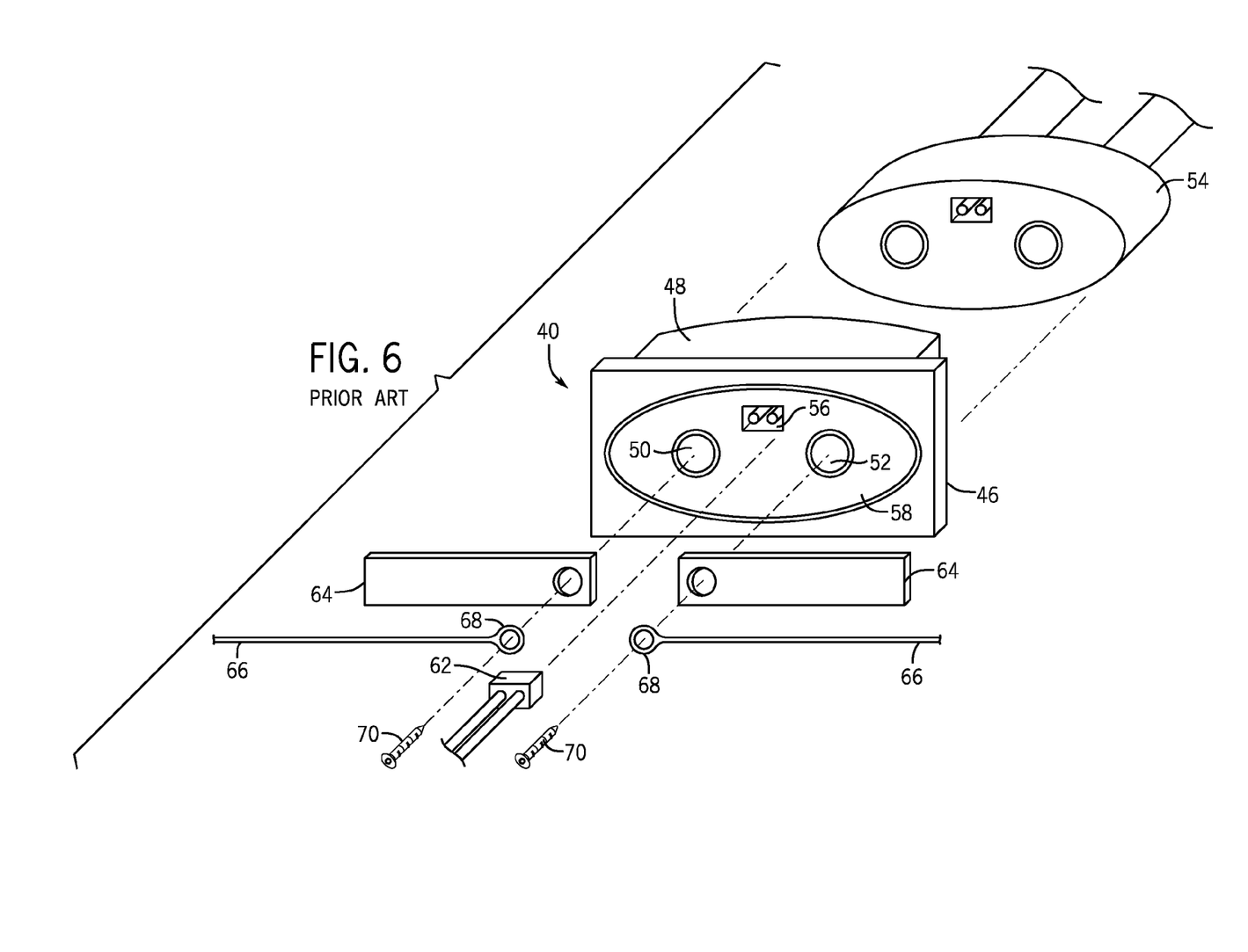
FIG. 6 is an exploded view of an assembly of a connection system for a high voltage battery using a conventional high voltage connector.

As discussed above, a mating high voltage plug 54 may be inserted into the external shell 48 of the high voltage connector 40, as illustrated in FIG. 6. On the other side of the high voltage connector 40, an HVIL plug 62 may be attached to the HVIL lines 56. Bus bars 64 may be attached to both the HV positive terminal 50 and the HV negative terminal 52. The bus bars 64 may be configured to route the high voltage power stored in the battery module 14 from the electrochemical cells internal to the battery module 14 to the HV positive terminal 50 and the HV negative terminal 52 of the high voltage connector 40.

To connect the measurement electronics to the HV positive terminal 50 and the HV negative terminal 52, the connection assembly includes high voltage (HV) sense lines 66 in the form of discrete wires that each, on one end, terminate in a ring terminal 68. The ring terminals 68 are placed around the HV positive terminal 50 and the HV negative terminal 52, as illustrated in FIG. 6. The bus bars 64 and the ring terminals 68 are then secured to the HV positive terminal 50 and the HV negative terminal 52 via screws 70. Alternatively, the bus bars 64 and/or the ring terminals 68 may be secured to the HV positive terminal 50 and the HV negative terminal 52 by welding or other electrical connection methods.

In the illustrated conventional connection assembly, the bus bars 64, ring terminals 68, and screws 70 function as part of the bolted joint used in the cabling required for the main high voltage lines. As such, the assembly time for the high voltage connector 40 is often relatively long, as the terminals and components are placed in a specific order and are routed away from the connection point in a particular manner. Additionally, any vibrations affecting the high voltage connector 40 may cause a loss of torque in the bolted or welded joint, weakening the connections between the various components.

Figure 7:
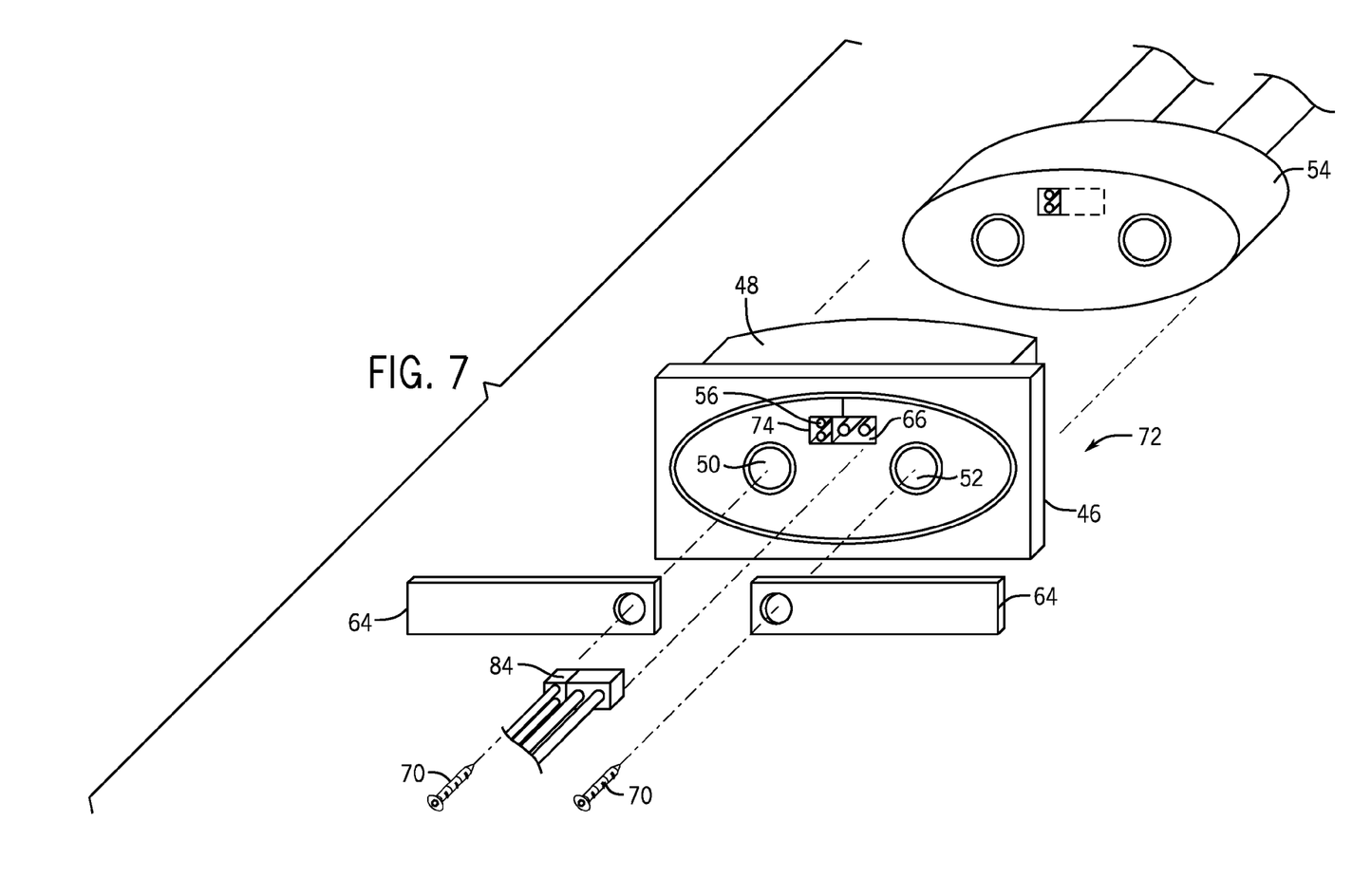
FIG. 7 is an exploded view of an assembly of a connection system for a high voltage battery using an integrated high voltage connector, in accordance with an embodiment of the present approach.
Figure 8:
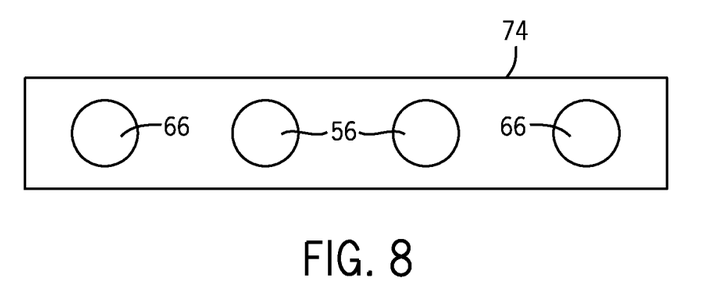
FIG. 8 is a front view of a secondary connection interface of the integrated high voltage connector of FIG. 7, in accordance with another embodiment of the present approach.
Figure 9:
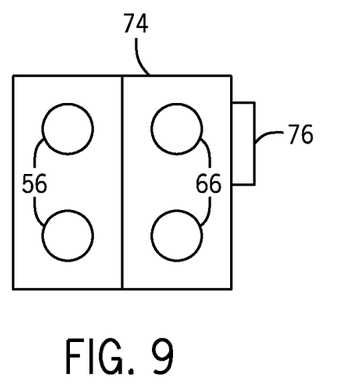
FIG. 9 is a front view of a secondary connection interface of the integrated high voltage connector of FIG. 7, in accordance with another embodiment of the present approach.
Figure 10:
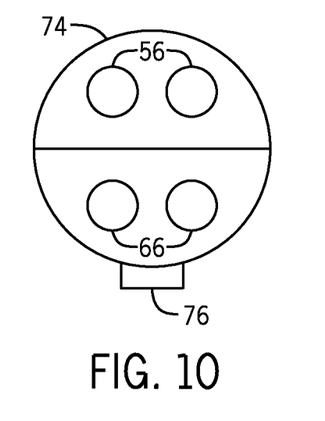
FIG. 10 is a front view of a secondary connection interface of the integrated high voltage connector of FIG. 7, in accordance with another embodiment of the present approach.

To simplify the assembly and minimize the likelihood of incorrect connections or routing of the HV sense lines 66, presently disclosed embodiments include an integrated high voltage connector. FIG. 7 illustrates the assembly of a connection system including the integrated high voltage connector 72. The illustrated integrated high voltage connector 72 facilities the connections for the HV positive terminal 50, the HV negative terminal 52, the HVIL lines 56, and the HV sense lines 66. As shown, the structure of the integrated high voltage connector 72 may be similar to that of the conventional high voltage connector 40. However, the integrated high voltage connector 72 does not utilize individual sense lines 66 connected to the HV terminals 50 and 52 via additional ring terminals 68. Instead, the HV sense lines 66 may be routed to the integrated high voltage connector 72 along with the HVIL lines 56 via a secondary connection interface 74. The HV sense lines 66 may be located proximate to the HVIL lines 56 to form the secondary connection interface 74. The pin configuration of the HVIL lines 56 and the HV sense lines 66 in the secondary connection interface 74 may vary, as illustrated in FIGS. 8-10.

Because the HV sense lines 66 are located within the secondary connection interface 74, there is no need to attach discrete wires with ring terminals 68 to the HV positive terminal 50 and the HV negative terminal 52. Therefore, only the bus bars 64 are secured to the HV positive terminal 50 and the HV negative terminal 52 using screws 70, welding, or some other electrical connection method. This may facilitate a relatively simple assembly process for the integrated high voltage connector 72, since additional ring terminals do not have to be properly attached.

A secondary connection plug 84 may be inserted into the secondary connection interface 74. In some embodiments, the secondary connection plug 84 may contain a key and the secondary connection interface 74 may contain a corresponding groove to ensure proper mating of the secondary connection plug 84. The mating high voltage plug 54 may be inserted into the external shell 48 of the integrated high voltage connector 72 to couple the battery module 14 with the high voltage network 42 and/or charger, and to close the HVIL circuit.

In the illustrated embodiment, the HVIL lines 56 extend throughout the integrated high voltage connector 72 in a manner similar to that of the conventional high voltage connector 40. The HV sense lines 66 are connected on one end to the HV terminals 50 and 52 and, as such, only extend from one side of the integrated high voltage connector 72. As shown in FIG. 7, the secondary connection interface 74, located within the internal shell 58, may act as an access point for both the HVIL lines 56 and the HV sense lines 66. In other embodiments, the secondary connection interface 74 may be located within the external shell 48. In such cases, the mating high voltage plug 54, rather than the secondary connection plug 84, may electrically connect the HV sense lines 66 to measurement electronics.

As noted above, there may be any number of pin configurations that are suitable for the secondary connection interface 74. As illustrated in FIG. 7, for example, the secondary connection interface 74 may include a pair of vertically oriented HVIL lines 56 disposed proximate a pair of horizontally oriented HV sense liens 66. Due to the mismatched orientations of these lines and the asymmetric shape of the secondary connection interface 74, this arrangement may prevent an operator from inserting the secondary connection plug 84 incorrectly. That is, the illustrated pin configuration may ensure proper matching of the HVIL lines 56 and the HV sense lines 66 through the integrated high voltage connector 72.

Another possible pin configuration of the HV sense lines 66 and the HVIL lines 56 is illustrated in FIG. 8. In this embodiment, the HVIL lines 56 and the HV sense lines 66 are all disposed in a linearly relative to one another, with the HV sense lines 66 at opposite ends. This may facilitate easier routing of the high voltage power from the HV terminals 50 and 52 to the HV sense lines 66 via the integrated high voltage connector 72. In other embodiments, the secondary connection interface 74 may have different shapes (e.g., square as in FIG. 9, circular as in FIG. 10, etc.), sizes, and arrangements of the HV sense lines 66 and/or the HVIL lines 56.

To prevent an incorrect mating between the secondary connection plug 84 and the secondary connection interface 74, the secondary connection interface 74 may include a keying feature. As shown in FIGS. 9 and 10, such keying features may include a groove 76 formed in the secondary connection interface 74. The groove 76 may be located proximate to either the HVIL lines 56 or the HV sense lines 66, or somewhere in between. In other embodiments, multiple grooves 76 of varying shapes may be included in the secondary connection interface 74. The corresponding secondary connection plug 84 may include a matching key to be inserted into the secondary connection interface 74. The key fits into the groove 76, ensuring that the mating between the secondary connection plug 84 and the secondary connection interface 74 is correct. Although the illustrated embodiments show the groove 76 in the secondary connection interface 74, in other embodiments the secondary connection interface 74 may include a key configured to mate with a groove formed in the secondary connection plug 84.

Figure 11:
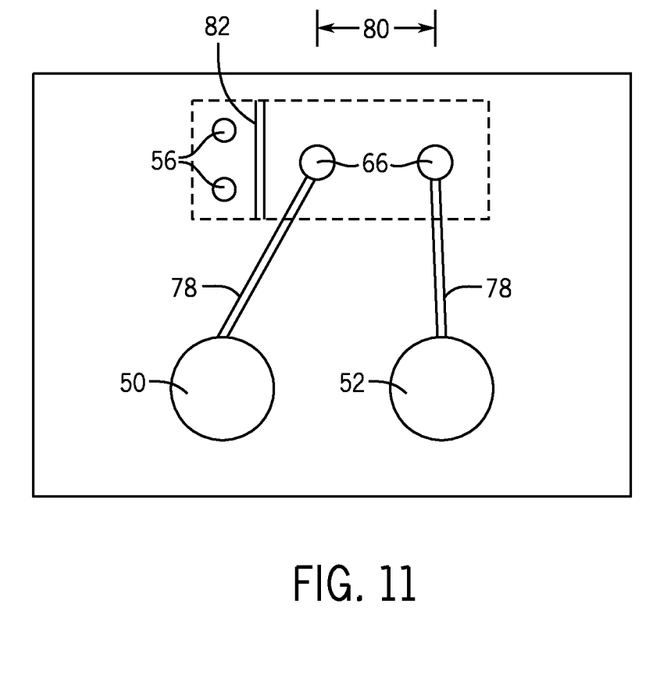
FIG. 11 is a schematic cross sectional view of the integrated high voltage connector of FIG. 7, in accordance with an embodiment of the present approach.

As mentioned above, the HV sense lines 66 are electrically connected to the HV positive terminal 50 and the HV negative terminal 52. Rather than using discrete wires with ring terminals, as described in relation to FIG. 6, the HV sense lines 66 may be electrically connected to the HV positive terminal 50 and the HV negative terminal 52 within the integrated high voltage connector 72. As illustrated in FIG. 11, the integrated high voltage connector 72 includes conductive leads 78 internal to the integrated high voltage connector 72 for coupling the HV sense lines 66 to the HV terminals 50 and 52. The conductive leads 78 may be made from one of the conductive materials used for the HV positive terminal 50 and the HV negative terminal 52.

As the HVIL lines 56 and the HV sense lines 66 represent low voltage and high voltage points, respectively, the secondary connection interface 74 may be designed to meet certain creepage and clearance requirements that ensure reliable electrical operation. Because the HVIL lines 56 and the HV sense lines 66 may operate at very different voltages, the creepage and clearance requirements may be a minimum distance between the two circuits and the lines within the HV sense circuit to prevent undesirable electrical effects such as arcing. For example, it may be desirable to have a minimum distance of approximately 5.0 mm between the two HV sense lines 66. In other embodiments, there may be a minimum distance of approximately 12.0 mm between the HVIL lines 56 and the HV sense lines 66. As such, the two pins of the HV sense lines 66 may therefore be separated by a creepage/clearance distance 80, as illustrated in FIG. 11.

In some embodiments, creepage and clearance requirements may be based on the types of material used to manufacture the integrated high voltage connector 72, rather than the physical distance between the low and high voltage circuits. Accordingly, there may be a creepage/clearance separator 82 between the HVIL lines 56 and the HV sense lines 66 to electrically isolate the two types of lines from one another. As one skilled in the art would appreciate, the main body of the integrated high voltage connector 72 surrounding the conductive terminals and pins may be made from an electrically insulating material. As such, the creepage/clearance separator 82 may be a portion of the main body that is thicker than the rest of the main body or that extends between the two types of pins. In other embodiments, the creepage/clearance separator 82 may be a piece of insulating material different from the insulating material used for the main body of the integrated high voltage connector 72. As noted above, the secondary connection interface 74 may vary according to pin configuration; however, the various embodiments of the secondary connection interface 74 generally comply with creepage and clearance requirements.

Figure 12:
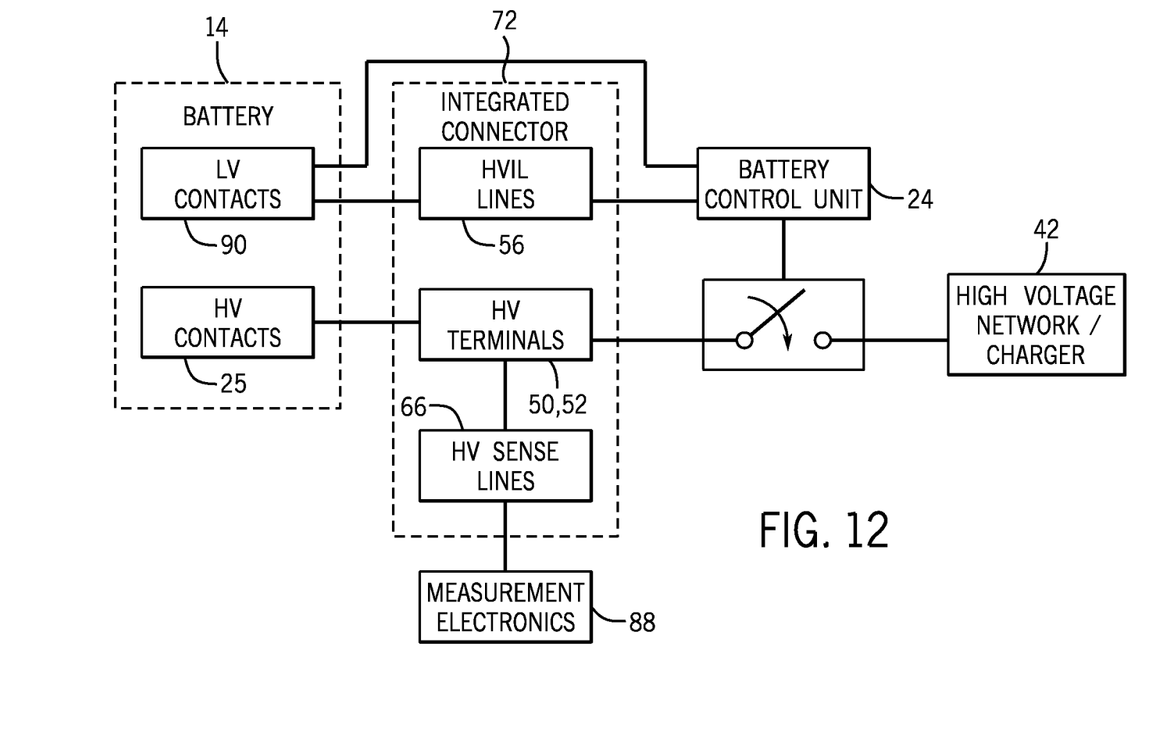
FIG. 12 is a block diagram illustrating the connections in a hybrid electric vehicle having a battery system, an integrated high voltage connector, a battery control unit, and measurement electronics.

As shown in FIG. 12, the integrated high voltage connector 72 incorporates many of the connections between the battery module 14 and various components of the HEV 10. For example, the integrated high voltage connector 72 facilitates the connections between the battery module 14, the battery control unit 24, the high voltage network 42, the high voltage charger, and measurement electronics 88. For example, the integrated high voltage connector 72 is configured to couple the HV contacts 25 within the battery module 14 to the high voltage network 72 of the HEV 10, or to a separate high voltage charger. In addition, the integrated high voltage connector 72 may complete the HVIL circuit between certain low voltage contacts 90 of the battery module 14 and the battery control unit 24 in order to close (e.g., via a relay 92) the high voltage circuit. Additionally, the integrated high voltage connector 72 includes the HV sense lines 66 and conductive leads 78 to allow high voltage power from the battery module 14 to reach the measurement electronics 88. Because certain connections (e.g., HVIL lines 56 and HV sense lines 66) are integral to the integrated high voltage connector 72, there may be a reduction in the number and types of connections that are made between the battery module 14 and various components of the HEV 10 during assembly.

In the embodiment depicted in FIG. 12, one or more additional low voltage circuits are connected from low voltage contacts 90 in the battery module 14 directly to the battery control unit 24, bypassing the integrated high voltage connector 72. In other embodiments, one or more of these low voltage circuits may be incorporated into the integrated high voltage connector 72 as well, depending on the type of application involved.

One or more of the disclosed embodiments, alone or in combination, may provide one or more technical effects useful for connecting a high voltage battery module to a high voltage network, charger, and measurement electronics. For example, certain embodiments may enable a reduced assembly time for the connection system for a high voltage battery system. Certain embodiments may also increase the reliability of the connection system. For example, the present integrated high voltage connector contains an access point for high voltage sense lines electrically coupled to the high voltage terminals. Such a structure does not require discrete wires with ring terminals to be attached to the high voltage terminals. The technical effects and technical problems in the specification are exemplary and are not limiting. It should be noted that the embodiments described in the specification may have other technical effects and can solve other technical problems.

While only certain features and embodiments of the invention have been illustrated and described, many modifications and changes may occur to those skilled in the art (e.g., variations in sizes, dimensions, structures, shapes and proportions of the various elements, values of parameters without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention.

Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery system, comprising:
   a battery module;
   a high voltage interlock (HVIL) circuit;
   measurement electronics configured to measure a parameter related to an output of the battery module; and
   an integrated connector coupled to the battery module, wherein the integrated connector comprises:
      a first side configured to interface with the battery module;
      a second side configured to interface with a mating plug coupled to a load;
      terminals extending through the first and second sides and configured to route power from the battery module to the mating plug;
      HVIL lines extending through the first and second sides and configured to complete the HVIL circuit when the mating plug is coupled to the integrated connector; and
      sense lines electrically connected to the terminals and configured to route an electrical signal from the terminals to the measurement electronics.

2. The battery system of claim 1, wherein the sense lines are disposed within the integrated connector and are coupled to the terminals via conductive leads disposed within the integrated connector.

3. The battery system of claim 1, comprising a battery control unit electrically connected to the HVIL circuit, wherein the battery control unit is configured to close the circuit between the integrated connector and the load when the HVIL circuit is closed and to open the circuit between the integrated connector and the load when the HVIL circuit is open.

4. The battery system of claim 1, wherein the HVIL lines and the sense lines are accessible through a secondary connection interface and wherein the battery system comprises a secondary connection plug configured to mate with the secondary connection interface.

5. The battery system of claim 4, wherein the secondary connection interface is disposed on the first side of the integrated connector and the mating secondary connection plug is integral with the battery module.

6. The battery system of claim 4, wherein the secondary connection interface is disposed on the second side of the integrated connector and the mating secondary connection plug is integral with the mating plug connected to the load.

7. The battery system of claim 1, wherein the battery module comprises bus bars attached via screws to the terminals extending through the first side of the battery module.

8. The battery system of claim 7, wherein the terminals, bus bars, and screws form a bolted joint in cabling for the terminals.

9. The battery system of claim 1, wherein the load comprises a high voltage network, a charger, or a combination thereof.

10. The battery system of claim 1, wherein the load operates at approximately 48 volts.

11. An electrical connector, comprising:
    a first side configured to interface with a battery module;
    a second side configured to interface with a mating plug coupled to a first load;
    terminals extending through the first and second sides and configured to route power at a first voltage from the battery module to the mating plug;
    low voltage lines extending through the first and second sides, wherein the low voltage lines operate at a voltage less than the first voltage;
    high voltage lines electrically coupled to the terminals via conductive leads and configured to route an electrical signal from the terminals to a second load; and
    a secondary connection interface configured to allow access to the low and high voltage lines.

12. The electrical connector of system 11, wherein the low and high voltage lines are arranged within the secondary connection interface such that there is a minimum distance between the low voltage lines and the high voltage lines within the electrical connector.

13. The electrical connector of system 11, wherein the secondary connection interface comprises a separator to electrically isolate the high voltage lines from the low voltage lines.

14. The electrical connector of system 13, wherein the electrical connector is made of an insulating material and the separator comprises a portion of the insulating material that is thicker than the rest of the electrical connector.

15. The electrical connector of system 13, wherein the separator is made of an insulating material.

16. The electrical connector of claim 11, wherein the secondary connection interface is configured to receive a mating secondary connection plug.

17. The electrical connector of claim 16, wherein the secondary connection interface comprises a groove and the mating secondary connection plug comprises a key configured to fit in the groove.

18. The electrical connector of claim 16, wherein the secondary connection interface comprises a key and the mating secondary connection plug comprises a groove configured to fit over the key.

19. The electrical connector of claim 16, wherein the secondary connection interface is disposed on the first side of the electrical connector and the mating secondary connection plug is integral with the battery module.

20. The electrical connector of claim 16, wherein the secondary connection interface is disposed on the second side of the electrical connector and the mating secondary connection plug is integral with the mating plug coupled to the first load.

21. The electrical connector of claim 11, wherein the second load comprises measurement electronics.

22. The electrical connector of claim 11, wherein the low voltage lines form part of a high voltage interlock (HVIL) circuit.

23. The electrical connector of claim 11, wherein the conductive leads are made of the same material as the terminals.

24. A power distribution system, comprising:
    a battery module configured to output a first voltage;
    measurement electronics configured to measure a parameter related to an output of the battery module;

a network comprising one or more loads and configured to receive the first voltage as an input via a mating plug; and an integrated connector comprising:
terminals configured to route power at a first voltage from the battery module to the mating plug;
HVIL lines configured to complete an HVIL circuit when the mating plug is coupled to the integrated connector; and
sense lines electrically connected to the terminals and configured to route an electrical signal from the terminals to the measurement electronics.

25. The power distribution system of claim 24, wherein the sense lines are disposed entirely within the integrated connector.

26. The power distribution system of claim 24, wherein the power distribution system comprises a charger configured to provide power as an input to the battery module.

27. The power distribution system of claim 24, wherein the power distribution system is disposed within an electric vehicle.

28. The power distribution system of claim 27, wherein the network comprises a belt alternator starter (BAS).

29. The power distribution system of claim 28, wherein the BAS is coupled to a regenerative braking system and is configured to function as a charger.

30. The power distribution system of claim 24, wherein the power distribution system comprises a DC-DC converter electrically connected to the battery module and configured to receive the first voltage as an input and to output a second voltage.

31. The power distribution system of claim 30, wherein the first voltage is approximately 48 volts and the second voltage is approximately 12 volts.

32. A method, comprising:
electrically coupling battery terminals of a battery module to a first load via terminals extending through an integrated connector;
completing a low voltage circuit of a battery system via low voltage lines extending through the integrated connector; and
electrically coupling the battery terminals of the battery module to a second load via conductive leads internal to the integrated connector and coupled to the terminals within the integrated connector.

* * * * *

UNITED STATES PATENT AND TRADEMARK OFFICE
CERTIFICATE OF CORRECTION

PATENT NO.         : 9,533,639 B2  
APPLICATION NO.    : 14/019396  
DATED              : January 3, 2017  
INVENTOR(S)        : Anthony E. Farrell Page 1 of 1

It is certified that error appears in the above-identified patent and that said Letters Patent is hereby corrected as shown below:

In the Specification

In Column 3, Line 12, delete "may" and insert -- may be --, therefor.

In Column 8, Line 52, delete "liens" and insert -- lines --, therefor.

In Column 10, Line 16, delete "high voltage network 72" and insert -- hight voltage network 42 --, therefor.

In Column 10, Line 62, delete "claims." and insert -- claims) --, therefor.

In the Claims

In Column 12, Line 21, in Claim 12, delete "The electrical connector of system" and insert -- The electrical connector of claim --, therefor.

In Column 12, Line 26, in Claim 13, delete "The electrical connector of system" and insert -- The electrical connector of claim --, therefor.

In Column 12, Line 30, in Claim 14, delete "The electrical connector of system" and insert -- The electrical connector of claim --, therefor.

In Column 12, Line 34, in Claim 15, delete "The electrical connector of system" and insert -- The electrical connector of claim --, therefor.

Signed and Sealed this  
Ninth Day of May, 2017

Michelle K. Lee  
*Director of the United States Patent and Trademark Office*